(No Model.)
R. N. DYER.
ELECTRIC METER.
No. 437,183. Patented Sept. 30, 1890.
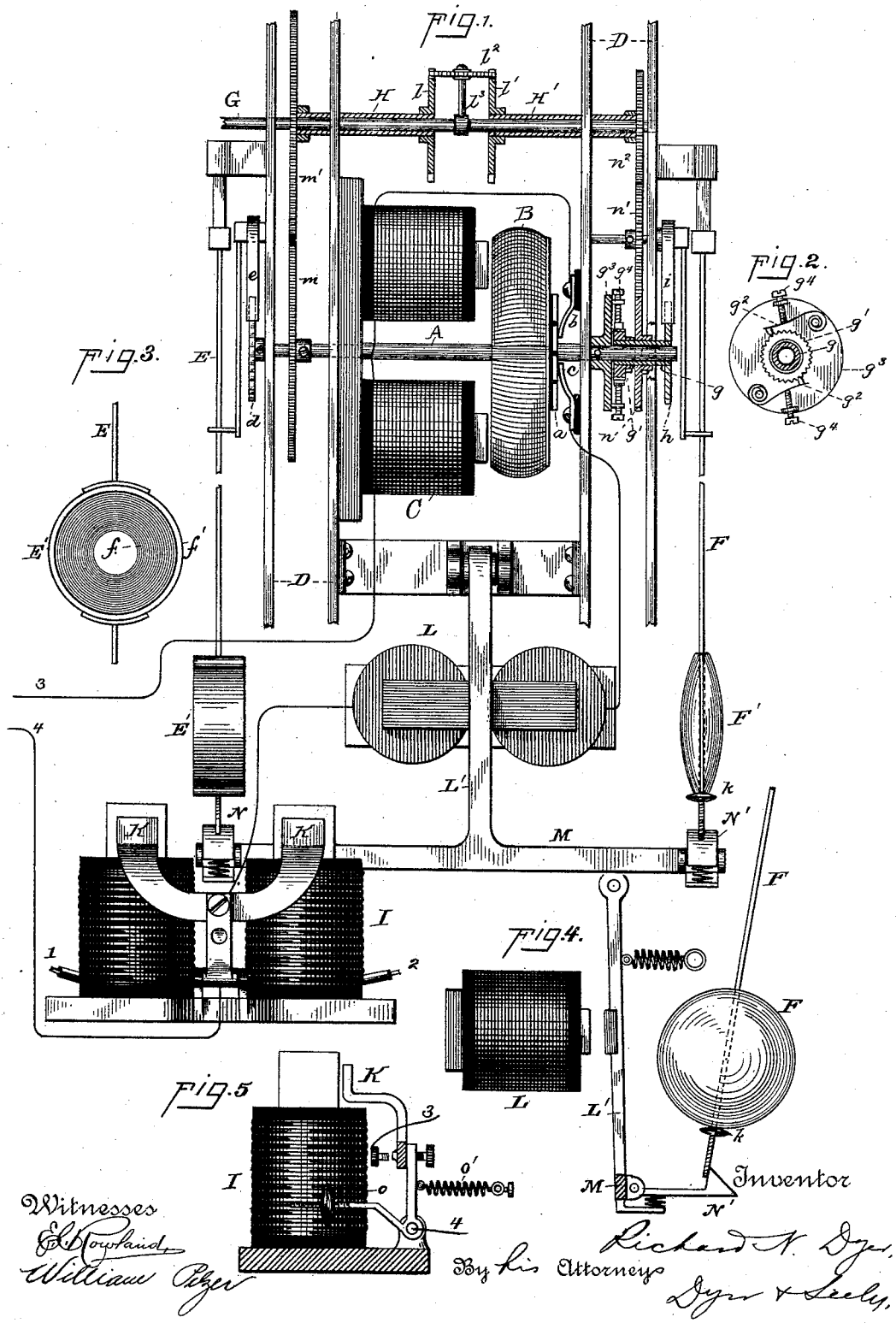

UNITED STATES PATENT OFFICE.

RICHARD N. DYER, OF EAST ORANGE, NEW JERSEY.

ELECTRIC METER.

SPECIFICATION forming part of Letters Patent No. 437,183, dated September 30, 1890.

Application filed January 5, 1888. Serial No. 259,920. (No model.)

*To all whom it may concern:*

Be it known that I, RICHARD N. DYER, of East Orange, in the county of Essex and State of New Jersey, have invented a certain new and useful Improvement in Electrical Meters, of which the following is a specification.

The object I have in view is to produce a meter for measuring the electric current which will give a direct reading in ampère hours or other units, will have a low rate of speed, will not require winding up at intervals, will run only while current is being used in the circuit that it guards, and will be simple and efficient in construction.

The invention consists in the several novel features and combinations of parts, as hereinafter explained, and pointed out by the claims.

In the accompanying drawings, forming a part hereof, Figure 1 is a side elevation and partial section of my meter; Fig. 2, a detail view illustrating the slipping connection between the motor and one escapement; Fig. 3, a face view of the bob of the accelerated pendulum; Fig. 4, a side view representing the means for hooking up the pendulums; and Fig. 5 a section through the main-line magnet, showing the circuit-controlling armature moved thereby.

In general terms my meter consists of an electric motor and two escapements controlled by pendulums. One pendulum-bob is a closed coil of wire, which swings through the field of an electro-magnet in the main line or in a shunt around resistance in the main line. Hence this pendulum is accelerated in its movement in direct proportion to the flow of current through the coils of the main-line magnet. The other pendulum is not accelerated electrically, and the bob of each or of one pendulum is adjustable, so that the initial speed of the pendulums can be made alike. Between one escapement, preferably the slower one, and the driving-shaft is a slipping connection to permit a difference in the movement of the escapements. This makes it possible to drive both escapements from one motor, which has advantages and is a feature of novelty independent of the character of the motor. The two escapements are connected through an epicycloidic gearing with an indicator, which will show only the difference in speed between the escapements, and hence will furnish a direct reading. The main-line magnet attracts an armature which closes a cross-circuit, including the electric motor, and also including a magnet, which releases the pendulums and starts them swinging. The armature of the electric motor may be mounted directly on the escapement-shaft or may be connected with it by a speed-reducing gearing.

With reference to the drawings, A is the escapement-shaft, upon which is mounted the motor-armature B, the field-magnet C being given, for cheapness, the simplest form. The motor-commutator is shown at $a$ and the commutator-brushes at $b$ $c$. The frame-plates carrying the mechanism are shown at D. On one end of the shaft A is fixed the escape-wheel $d$, with which engages the escapement-anchor $e$, which is moved by the pendulum E. The bob E' of this pendulum is composed of a closed coil $f$ of fine copper wire, held within a ring $f'$. Upon the opposite end of the shaft A is mounted a sleeve $g$, provided on its inner end with a finely-notched wheel $g'$, with the teeth of which engage the points of spring-arms $g^2$, held on a disk $g^3$, fixed to the shaft A and playing under adjusting-screws $g^4$. On the outer end of the sleeve $g$ is an escape-wheel $h$, with which engages an escapement-anchor $i$, which is moved by the pendulum F. The bob F' of this pendulum is of any ordinary form, and is made adjustable upon the stem of the pendulum by means of a nut $k$. The unit-shaft G of the indicator carries two oppositely-turning sleeves H H', provided with gear-wheels $l$ $l'$ on their adjoining ends, which engage opposite sides of a wheel $l^2$, mounted to turn on the end of an arm $l^3$, fixed to and projecting from the indicator-shaft G. The shaft A is connected with the sleeve H by two wheels $m$ $m'$, while the sleeve $g$ is connected with the sleeve H' by three wheels $n$ $n'$ $n^2$.

I is the main-line magnet, through the field of which the bob E' swings. Its circuit 1 2 is the main line of the circuit whose current is to be measured. It is constructed to work well within the point of saturation. An armature K is placed so as to be attracted by the magnet I. This armature is nicely balanced by an adjustable weight $o$ and a retracting-spring $o'$, so that the spring slightly predominates and draws the armature to its back point; but the minimum current through the coils of the magnet I is sufficient to draw the armature to its front point. This armature K closes at its front point a circuit 3 4, which is a cross or multiple-arc circuit from the circuit whose current is to be measured. The circuit 3 4 includes the armature and field-magnet of the electric motor. It also includes the magnet L, whose armature-lever L' carries a cross-bar M, having on its ends spring catch-arms N N', which when the armature is not attracted by the magnet catch the pendulums and hold them at rest in an inclined position.

The operation is as follows: When the circuit is closed through the first translating device, current will flow in the coils of the magnet I. This magnet will attact the armature K, which will close the cross-circuit 3 4 to the motor B C and to the magnet L. The magnet L will attract its armature and will withdraw the spring-arms N N' from engagement with the pendulums, which, being unhooked, will start to swing and will be kept swinging by the motor. The bob E' as it swings through the field of the magnet I will be accelerated, and this effect will increase as the magnet I is given more strength, due to the connection of more translating devices with the circuit. The bob F' is so adjusted that but for the retarding effect of the main-line magnet I the two pendulums would swing together. The pendulum F having a slower speed than the pendulum E, the difference in movement is permitted by the slipping of the spring-arms $g^2$ on the teeth of the wheel $g'$. The indicator will show the difference in movement between the two pendulums, which will be the movement due to the current flowing through the coils of the magnet I. Now, as translating devices are removed from the circuit the pendulum E will have a slower movement. When the last translating device is removed from the circuit, the magnet I will release the armature K, which will open the circuit 3 4, causing the motor to stop and the magnet L to release its armature. The spring catch-arms N N' will be thrown up into the paths of the pendulums E F and will catch them and hold them in an inclined position.

What I claim is—

1. In an electrical meter, the combination, with differentiated escapements, one of which is affected in speed by the current to be measured, of a single driving-motor having a slipping or compensating connection with one of such escapements, substantially as set forth.

2. In an electrical meter, the combination, with differentiated escapements, one of which is affected in speed by the current to be measured, of a single electric motor driving the escapements and having a slipping or compensating connection with one of such escapements, substantially as set forth.

3. In an electrical meter, the combination, with an escapement arranged to be affected in speed by the current to be measured, of an electric motor driving the escapement and a main-line-circuit controller controlling the circuit of such electric motor, substantially as set forth.

4. In an electrical meter, the combination, with differentiated escapements, one of which is affected in speed by the current to be measured, of an electric motor driving the escapements and a main-line-circuit controller controlling the circuit of such electric motor, substantially as set forth.

5. In an electrical meter, the combination, with differentiated escapements, of a main-line magnet acting to accelerate one of such escapements and a circuit-controlling armature moved by the same main-line magnet, substantially as set forth.

6. In an electrical meter, the combination, with two differentiated pendulums, one having as a bob a closed coil of wire, of a magnet, through the field of which the wire bob swings, a circuit-controlling armature moved by said magnet, and a magnet acting to hook up the pendulums and having its circuit controlled by said armature, substantially as set forth.

7. In an electrical meter, the combination, with a single driving electric motor, two escapements, one of which has a slipping or compensating connection with the motor, and differential gearing from said escapements to an indicator, of two pendulums controlling the escapements, one of such pendulums having as a bob a closed coil of wire, a main-line magnet, through the field of which the wire bob swings, a magnet acting to hook up the pendulums, and an armature attracted by the main-line magnet and controlling a circuit including the electric motor and the hooking-up magnet, substantially as set forth.

This specification signed and witnessed this 31st day of December, 1887.

RICHARD N. DYER.

Witnesses:
 WILLIAM PELZER,
 E. C. ROWLAND.